(12) United States Patent
Popp

(10) Patent No.: US 9,500,809 B2
(45) Date of Patent: Nov. 22, 2016

(54) PRECISION TWO-DIMENSIONAL FIBER-COLLIMATOR-ARRAY

(75) Inventor: Gregor Popp, Munich (DE)

(73) Assignee: Schleifring und Apparatebau GmbH, Fürstenfeldbruck (DE)

( * ) Notice: Subject to any disclaimer, the term of this patent is extended or adjusted under 35 U.S.C. 154(b) by 131 days.

(21) Appl. No.: 13/563,973

(22) Filed: Aug. 1, 2012

(65) Prior Publication Data

US 2013/0195402 A1    Aug. 1, 2013

(30) Foreign Application Priority Data

Aug. 23, 2011 (EP) .................................. 11178443

(51) Int. Cl.
| | | |
|---|---|---|
| G02B 6/26 | (2006.01) | |
| G02B 6/32 | (2006.01) | |
| G02B 6/36 | (2006.01) | |

(52) U.S. Cl.
CPC .............. *G02B 6/322* (2013.01); *G02B 6/32* (2013.01); *G02B 6/3604* (2013.01); *G02B 6/3664* (2013.01); *G02B 6/3672* (2013.01)

(58) Field of Classification Search
CPC ............ G02B 6/32; G02B 6/36; G02B 6/38; G02B 6/42; G02B 6/3885; G02B 6/3818; G02B 6/3672; G02B 6/3644; G02B 6/3834; G02B 6/3692
See application file for complete search history.

(56) References Cited

U.S. PATENT DOCUMENTS

| | | | |
|---|---|---|---|
| 5,453,835 A * | 9/1995 | Ward et al. .................. 356/450 |
| 6,644,862 B1 | 11/2003 | Berto et al. | |
| 6,766,086 B1 | 7/2004 | Sherman et al. | |
| 7,606,454 B2 * | 10/2009 | Furusawa ..................... 385/120 |
| 7,689,091 B1 * | 3/2010 | Christman ................... 385/137 |
| 2001/0051028 A1 | 12/2001 | Gutierrez et al. | |
| 2002/0172490 A1 | 11/2002 | Bonja | |
| 2002/0197047 A1 | 12/2002 | Basavanhally et al. | |
| 2003/0202769 A1 * | 10/2003 | Gutierrez ............ G02B 6/3652 385/137 |
| 2004/0042732 A1 | 3/2004 | Bruns | |
| 2004/0052494 A1 * | 3/2004 | Kobayashi ........... G02B 6/3656 385/137 |
| 2007/0183733 A1 | 8/2007 | Zheng et al. | |
| 2008/0226231 A1 * | 9/2008 | Popp .................... G02B 6/3604 385/34 |
| 2009/0303580 A1 | 12/2009 | Popp et al. | |
| 2010/0195956 A1 * | 8/2010 | Zhang ................. G02B 6/3604 385/26 |

FOREIGN PATENT DOCUMENTS

WO         02073274 A1    9/2002

* cited by examiner

*Primary Examiner* — Sung Pak
*Assistant Examiner* — Hoang Tran
(74) *Attorney, Agent, or Firm* — Yakov Sidorin; Quarles & Brady LLP

(57) ABSTRACT

A collimator system comprises a micro lens array and a fiber array. The fiber array has a substrate with a plurality of holes for holding a plurality of optical fibers. The fibers are glued into the holes. Before gluing, each of the fibers is positioned against the same side of a corresponding hole resulting in all fibers being located substantially equally with respect to the holes. The lens array is mounted with an offset to the fiber array resulting in alignment of the fibers and the lenses.

13 Claims, 5 Drawing Sheets

PRECISION TWO-DIMENSIONAL FIBER-COLLIMATOR-ARRAY

CROSS-REFERENCE TO RELATED APPLICATIONS

This application claims priority from European Patent Application No. 11178443.5 filed on 23 Aug. 2011, the entire disclosure of which is incorporated herein by reference in its entirety.

TECHNICAL FIELD

The invention relates to a fiber optic collimator system, an, in particular, to such system for use in optical rotary joints, optical rotary joints, fiber arrays, and a method for manufacturing a fiber collimator array and a fiber array.

BACKGROUND ART

Multichannel optical rotary joints are often using a derotating optical element to compensate for the movement between the rotating parts. Such a derotating optical element may include a Dove prism or an Abbe-Koenig prism. In most cases light is transmitted by using optical fibers such as, for example, glass fibers or plastic fibers. For coupling the light from the optical fibers into and out of the derotating optical elements, collimators are used.

U.S. Pat. No. 5,371,814 discloses an optical rotary joint for a plurality of channels, having a Dove prism. An arrangement having a plurality of GRIN lenses is provided for coupling light into or out of glass fibers. Beam coupling is performed by several separate lenses. These lenses must be adjusted individually. A precise adjustment requires a comparatively large amount of time. Furthermore, the lenses consume a lot of space. As a result, the area to be projected, i.e. the entire surface projected via the derotating system, increases as the number of channels and the precision in adjustment increases. Therefore, a larger optical system is necessary, which also has a higher optical attenuation as a result of the longer optical paths and, at the same time, involves higher demands on the precision in adjustment.

To reduce the size of the optical system and the derotating optical element and to increase the number of channels, micro optic collimators are used. A micro optic collimator may include a fiber array and a micro lens array attached thereto.

U.S. Pat. No. 6,726,372 B1 discloses a two-dimensional micro lens array, which allows arranging of optical fibers with a high density. It includes a plurality of sticks forming conically shaped openings for holding and centering of the fibers. The disadvantage of this array is the comparatively complex assembly of a plurality of sticks that must be assembled together with high precision.

Much easier to assemble is the fiber array that has a one piece base plate, also called substrate. Such a substrate is disclosed in the German patent application DE 10304977 A1. Here, 3 flexible springs are located within each hole for centering the fiber within the hole. This allows easy assembly by simply inserting the fiber into a hole. The fiber is automatically centered therein. The disadvantages of this system are the comparatively complex shape of the substrate and the resulting high manufacturing costs.

SUMMARY OF THE INVENTION

The embodiments provide a fiber optic collimator, a two dimensional fiber array, a rotary joint based on the fiber collimator and a method for manufacturing the fiber array or the collimator, where the fiber collimator includes a plurality of lenses on a micro lens array.

A fiber optic collimator includes a lens system having a micro lens array with a plurality of lenses. Optical fibers are positioned in close proximity to these lenses. It is essential to position each fiber precisely in relation to its lens. For this purpose, fibers are often assembled within a fiber array. This fiber array can now be positioned as a whole in relationship to the lens array. Therefore, it is no longer necessary to individually adjust a large number of fibers with respect to their lenses. Most fiber arrays include of a body, also called the substrate, having a plurality of holes for holding the fibers. To allow for insertion of the fibers into the holes, the holes must have slightly larger inner diameters than the outer diameters of the fibers. After inserting the fibers, the fibers may be fixed by some glue or cement, preferably epoxy or a similar material, all herein referred as glue. If the exact location of a fiber within its hole is not defined, it may be positioned off the ideal position with respect to its lens. Methods to center the fibers within the holes include, for example, the appropriate use of springs within the holes. These allow a precise and repeatable placement of fibers at the center of the holes.

The fiber array includes a substrate for holding a plurality of fibers. The substrate has a plurality of holes that have dimensions larger than the diameters of the fibers to be inserted in the holes. The fibers within the holes are not centered with respect to the holes. Instead, the fibers are positioned against the same side of their holes. As an example, the fibers may be positioned against the bottom of the corresponding holes. Of course they may be positioned against any other side of the holes. Essential is that each fiber from a plurality of fibers is positioned against the same side of the corresponding wall of the hole as any other fiber. This results in constant separations, in two dimensions, on the surface of the substrate between any two fibers, if the holes are also defined at constant separations from one another. This allows easy adjustment of the lens array with respect to the fiber array to assemble a collimator. As the fibers are slightly offset from the center of the holes, the lens array may have a slightly shorter side allowing the lenses to directly align with the fibers of the fiber array.

The fiber array may have additional holes, in which the fibers are not necessarily positioned against the same side of the holes. Optic channels associated with these holes may have different, for example higher, attenuation due to displacement of the fibers with respect to their lenses. Furthermore, fibers may be divided into groups of fibers such that the fibers in one group are positioned to the same sides of their holes, but to different sides of their holes as compared to another groups.

In a further embodiment the holes have round, elliptical or trapezoidal shapes. It is further preferred if at least one fiber is parallel to its hole.

In another embodiment, the holes have structural restrictions or notches close to the ends located towards the lenses. The purpose of these restrictions is to press the fiber towards the opposite wall of the hole. Preferably the restriction is of a material which is softer than the fiber thus allowing the fiber to deform the restriction, when the fiber is inserted into the hole. Furthermore, the restrictions may have some conical shapes or may have bevels to simplify insertion of the fiber at the restrictions. The restrictions may be made from material(s) differing from that of the substrate, such as a soft metal, plastic or wax. If the restriction material is the same as the material of the substrate (which may include silicon or germanium, for example), a comparatively hard oxide layer may be removed from the surface of the restriction by etching.

According to another embodiment, a lever is provided within each hole to press the fiber into a predetermined direction.

A collimator includes of at least one fiber array and a lens array. The lens array is adjusted in such a way that a plurality of fibers is positioned against a plurality of lenses.

Preferably, the lens array has at least one side that can be aligned with at least another side of the fiber array resulting in the lenses to directly align with the fibers of the fiber array.

A fiber optic rotary joint includes of at least one collimator, preferably two collimators, and an optical derotating system, such as that including a Dove prism.

A method for manufacturing a fiber array which has a plurality of optical fibers being held at a common substrate includes the steps of:
 I. forming holes within the substrate, the holes being larger than the outer dimensions of the corresponding fibers;
 II. inserting the fibers into the corresponding holes;
 III. positioning the fibers against the same sides of the walls of the corresponding holes;
 IV. gluing so positioned the fibers to fixate their positions;

The step of gluing means basically hardening of glue. The glue may be disposed before, after, or together with inserting the fibers into the holes.

The step of positioning the fibers may be done using a centrifuge. Here, the fibers are inserted into the holes. Furthermore, some glue is inserted into the holes. Afterwards, the fiber array is placed into a centrifuge so that the fibers are positioned against the same sides of the holes by centrifugal forces. When the glue hardens, the fibers remain in their positions.

There are further methods for generating a force for positioning the fibers against the same sides of the holes instead of using centrifugal force. These may be magnetic forces by applying an external magnet and covering the fibers with a magnetic material thus attracting or repelling the fiber. Furthermore magnetic particles may be distributed within the glue thus attracting or repelling the glue which displaces the fiber into the opposite direction. Furthermore the electrostatic forces may be used. In an alternative the surface tension of one side of the holes may be increased to repel the glue which then displaces the fiber towards the side of the hole with increased surface tension. Furthermore placement may be done by vacuum by micro channels which may be integrated into the substrate. In another embodiment the fibers may be bent by applying mechanical forces into the desired direction.

Herein the term fiber is used for optical fibers which may specifically be glass fibers like single mode fibers or multimode fibers or plastic fibers.

BRIEF DESCRIPTION OF THE DRAWINGS

In the following, the invention will be described by way of example, without limitation of the general inventive concept, on examples of embodiment and with reference to the drawings.

Figure 1:
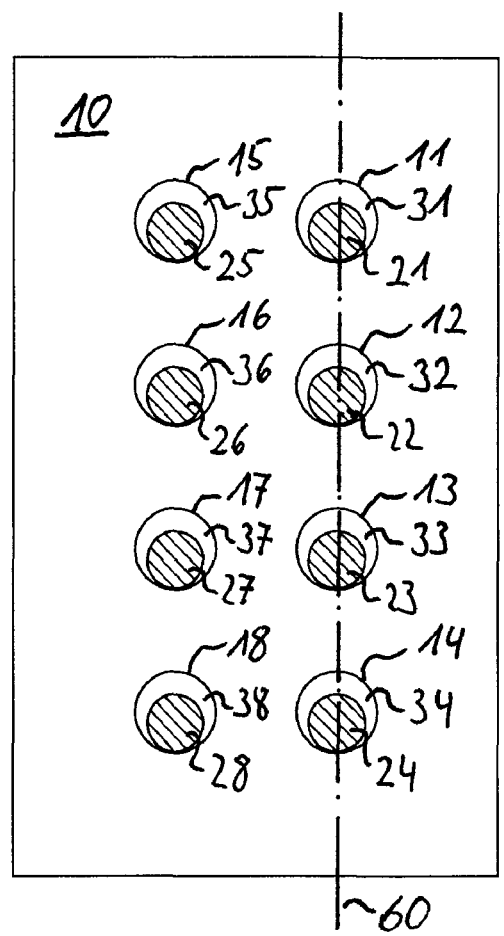
FIG. 1 shows a front view of a fiber array.

While the invention allows for various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIG. 1 a preferred embodiment is shown. The fiber array is based on the substrate 10. Within the substrate holes 11, 12, 13, 14, 15, 16, 17 and 18 are provided. Fibers 21, 22, 23, 24, 25, 26, 27 and 28 are located within the corresponding holes or channels in the substrate 10. All fibers are located against the bottom side of the holes therefore leaving corresponding gaps 31, 32, 33, 34, 35, 36, 37 and 38.

Figure 2:
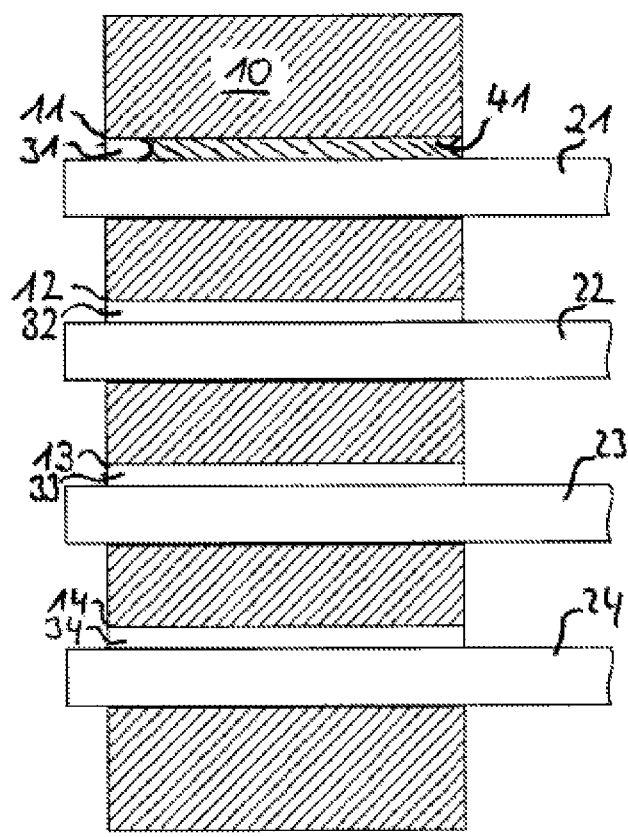
FIG. 2 shows a side cut view of the fiber array of FIG. 1.

FIG. 2 shows a side cut view through sectional plane 60 of FIG. 1. Here again the fibers can be seen located against the bottom side of the holes (as viewed) and leaving corresponding gaps above the fibers. Here the fibers are axially parallel to their corresponding holes. Furthermore gap 31 of hole 11 is filled with glue 41. The other gaps may be filled accordingly. Here the other fibers are shown before they are glued into the holes. There is an excess fiber length at the left side which will be reduced to the same plane as the substrate by polishing.

Figure 3:
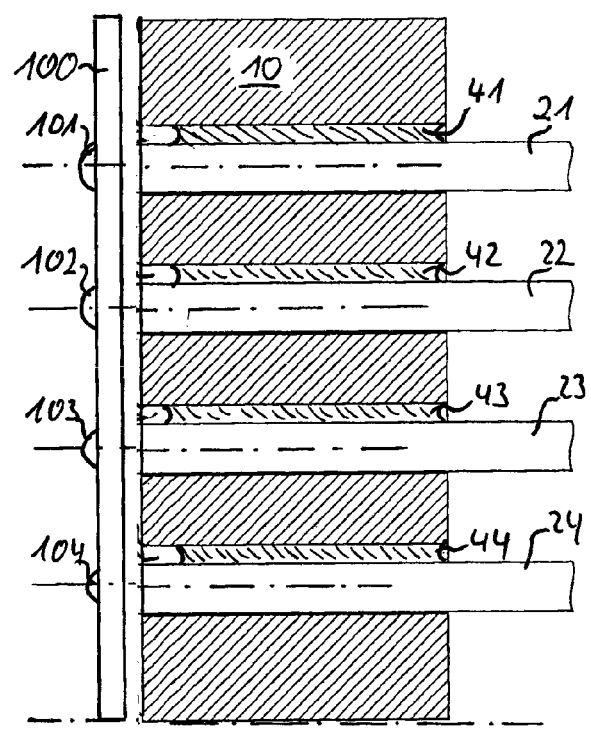
FIG. 3 shows a side cut view of the fiber array FIG. 1 together with a micro lens array.

FIG. 3 shows the fiber array of the previous figure now with further glue 42, 43 and 44 inserted into gaps 32, 33 and 34. Furthermore, a micro lens array is shown (not cut). It includes of a substrate 100 and micro lenses 101, 102, 103 and 104. Each micro lens is aligned with its corresponding fiber having a common optical axis as shown by the dashed line therethrough. Furthermore, it is preferred, when the substrate of the micro lens array is cut in such a way that when the sides of the arrays are aligned, also the fibers of the fiber array are aligned with the lenses of the lens array.

Figure 4:
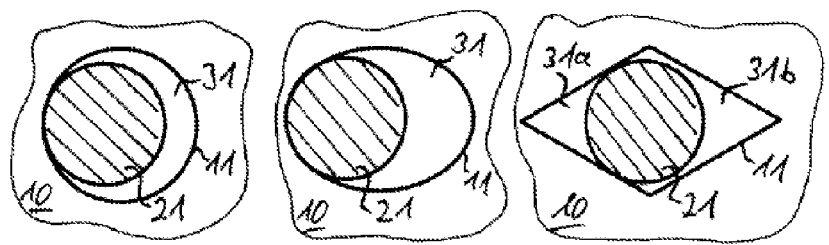
FIG. 4 shows three different embodiments of holes in a substrate.

FIG. 4 shows three different embodiments of holes 11. On the left side, a hole 11 is shown that has a round cross-section. In the center of FIG. 4, a hole 11 having an elliptical cross-section isis shown. On the right side, a trapezoidal-cross-section hole 11 is shown. While the round and elliptical holes allow only one gap 31 between the inserted fiber 21 and a wall of the hole, the trapezoidal hole has two gaps 31a and 31b. Preferably both gaps are filled with glue, but it may be sufficient to fill only one of the gaps to fixate the position of the fiber 21.

Figure 5:
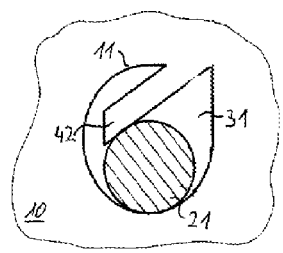
FIG. 5 shows a hole with a lever.

FIG. 5 shows a hole with a lever within the hole to press the fiber into a predetermined direction. Preferably the gap is also filled with glue. In a preferred embodiment the lever is only at the surface of the hole, allowing easier manufacturing and complete filling of the hole with glue.

Figure 6:
FIG. 6 shows holes with structural restrictions.

FIG. 6 shows a hole with a restriction. In the left part of this figure the hole 11 is shown with a restriction 43 before insertion of a fiber. The right portion of this figure shows the hole after insertion of the fiber. The restriction has been deformed or compressed by the fiber and presses the fiber to the opposite side wall of the hole.

Figure 7:
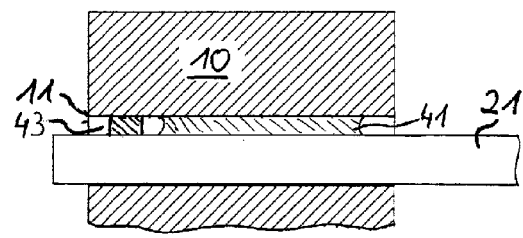
FIG. 7 shows a side cut view of a hole with a structural restriction.

FIG. 7 shows a side cut view of the hole or channel 11 with a restriction 43 after insertion of the fiber 21. It can be seen that the restriction 43 is only at the left side of the hole 11 (as viewed), which is oriented towards the lenses. The gap behind the restriction is filled with glue 41. Preferably, the restriction 43 is configured to keep the fiber at a predetermined position at least until the glue has hardened. Such structural restriction 43 may also be designed in such a way that no more glue is necessary. The restriction 43 is located, in the hole or channel 11, preferably closer to the side proximal the lenses, but it may also be at the opposite side of the substrate a distal side, in relation to the lenses), if the fibers are stiff enough.

Figure 8:
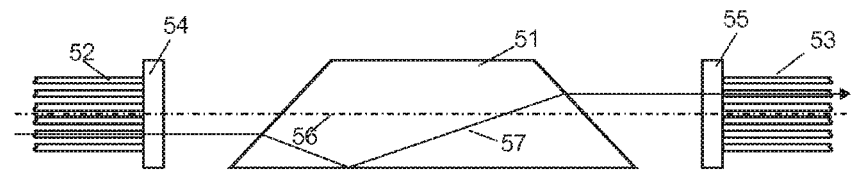
FIG. 8 shows a rotary joint.

FIG. 8 shows in a schematic form an embodiment of an optical rotary joint having at least one lens system in accordance with at least one of the embodiments described herein. The optical rotary joint includes a first lens system 54 for coupling of first light-waveguides 52, and also a second lens system 55 for coupling of second light-waveguides 53. The second collimator arrangement 55 is supported to be rotatable relative to the first collimator arrangement 54 about a rotation axis 56. A derotating element in the form of a Dove prism 51 is located in a beam path between the first collimator arrangement 54 and the second collimator arrangement 55 to compensate for the rotary movement. An example of a ray path of a light ray 57 is shown, which starts from one of the first light wave guides 52 and passes via the first collimator arrangement 54, through the Dove prism 51, and via the second collimator arrangement 55 up to and into one of the second light-waveguides 53.

It will be appreciated to those skilled in the art having the benefit of this disclosure that this invention is believed to provide optical rotary joints and micro-optical systems, such as collimators and fiber arrays, used for multichannel transmission of optical signals. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

LIST OF REFERENCE NUMERALS 10 substrate
11,12,13,14,15,16,17,18 holes in substrate
21,22,23,24,25,26,27,28 fibers
31,32,33,34,35,36,37,38 gap
41 adhesive
42 lever
43 restriction
51 Derotating optical element
52 First light-waveguides
53 Second light-waveguides
54 First collimator arrangement
55 Second collimator arrangement
56 Rotation axis
57 Light ray
60 sectional plane 10 Gantry

What is claimed is:

1. A fiber array including
a substrate having a monolithic solid body consisting of a single component limited by two surfaces, each portion of said substrate remaining motionless with respect to another portion thereof during a process of affixing an optical fiber therein,
said substrate having a plurality of holes therethrough, each hole defined by
(i) a first end at one of the two surfaces and a second end at another of the two surfaces, and
(ii) a continuous wall contained completely within said solid body and, when a corresponding optical fiber is being fixed within the fiber array, remaining uninterrupted from the first end to the second end through the solid body such as to define a cross-section having at least one of round, elliptical, and trapezoidal shapes, said cross-section being uniform in shape along whole length of the hole between said first and second ends,
said plurality of holes configured to hold a plurality of optical fibers within the holes by means of glue,
wherein, when said plurality of optical fibers is fixed within the fiber array, each optical fiber from the plurality of optical fibers is positioned against and is in contact with the same side of a continuous wall of a corresponding hole and is axially parallel to the wall of the hole along a length of the hole,
said fiber array further comprising a stationary restriction element within bounds of the continuous wall between the first and second ends of each corresponding hole from the plurality of holes, said restriction element configured to press the fiber in a predetermined direction.

2. A collimator including at least one fiber array according to claim 1.

3. A collimator according to claim 2, further comprising a lens array having at least one side, said at least one side being alignable with at least one side of the fiber array such as to align each of lenses of the lens array directly with a respectively corresponding optical fiber from the plurality of optical fibers of the fiber array.

4. A rotary joint including at least one collimator according to claim 2 and further comprising at least one derotating optical element.

5. A rotary joint according to claim 4, further comprising a lens array having at least one side that is configured to be alignable with at least one side of the at least one fiber array such as to align lenses of the lens array directly with respectively corresponding fibers from the plurality of optical fibers of the at least one fiber array.

6. A fiber array including
a substrate having a monolithic single-piece solid body limited by first and second surfaces, each portion of said substrate remaining motionless with respect to another portion thereof during a process of affixing an optical fiber therein, and
a plurality of holes throughout said solid body, each hole having a length defined within said solid body between said first and second surfaces,
wherein the holes are configured to hold a plurality of optical fibers by means of glue within the holes between the first and second surfaces, wherein, when said plurality of optical fibers is fixed within the fiber array, each optical fiber is positioned against and in contact with the same side of a wall of a corresponding hole and axially parallel to the wall of the corresponding hole along the length of the corresponding hole, the holes from the plurality of holes having at least one of round, elliptical and trapezoidal shapes and corresponding cross-sections that are uniform in shape along lengths of the holes from said first surface to said second surface, and a lever provided within each hole from the plurality of holes, said lever configured to press a corresponding fiber in a predetermined direction.

7. A collimator including at least one fiber array according to claim 6.

8. A collimator according to claim 7, further comprising a lens array having at least one side which is alignable with at least one side of the at least one fiber array such as to align lenses directly with respectively corresponding fibers from the plurality of optical fibers of the at least one fiber array.

9. A rotary joint including at least one collimator having at least one fiber array according to claim 6 and at least one derotating optical element.

10. A rotary joint according to claim 9, further comprising a lens array having at least one side which is alignable with at least one side of the at least one fiber array such as to align lenses directly with respectively corresponding fibers from the plurality of optical fibers of the at least one fiber array.

11. A method for manufacturing a fiber array, the fiber array having a plurality of optical fibers held affixed at a common substrate, the method comprising the steps of I. forming holes through the common substrate having a monolithic single-piece solid body limited by two surfaces, each portion of said substrate remaining motionless with respect to another portion thereof during a process of affixing an optical fiber therein, said holes defined completely within the single-piece solid body between the two surfaces, each of the holes having
  a transverse dimension that is larger than a corresponding optical fiber of the plurality of optical fibers and having at least one of round, elliptical or trapezoidal shape and further having at least one of a restriction element,
  a notch configured to press the corresponding fibers in a predetermined direction, and
  a cross-section that is uniform in shape along a whole length of the hole from said first surface to said second surface;

II. inserting optical fibers into corresponding holes;

III. positioning the optical fibers against the same sides of walls of the corresponding holes while maintaining transverse dimensions of each of the holes unchanged; and IV. gluing so positioned optical fibers to the substrate to fix positions of the fibers.

12. A rotary joint including at least one collimator having at least one fiber array according to claim 6 and a Dove prism.

13. A rotary joint including at least one collimator having at least one fiber array according to claim 1 and a Dove prism.

* * * * *